United States Patent [19]
Friedrich et al.

[11] Patent Number: 5,530,325
[45] Date of Patent: Jun. 25, 1996

[54] SPEED CONTROL CIRCUIT FOR A UNIVERSAL MOTOR

[75] Inventors: Hornung Friedrich, Stuttgart; Heisler Matthias, Constance, both of Germany

[73] Assignee: Robert Bosch GmbH, Stuttgart, Germany

[21] Appl. No.: 81,385

[22] PCT Filed: Nov. 16, 1991

[86] PCT No.: PCT/DE91/00897

§ 371 Date: Jun. 24, 1993

§ 102(e) Date: Jun. 24, 1993

[87] PCT Pub. No.: WO92/11688

PCT Pub. Date: Jul. 9, 1992

[30] Foreign Application Priority Data

Dec. 24, 1990 [DE] Germany .................. 40 41 711.5

[51] Int. Cl.⁶ .................................................. H02P 5/32
[52] U.S. Cl. ............................................................ 318/245
[58] Field of Search ................................. 318/245, 246, 318/248

[56] References Cited

U.S. PATENT DOCUMENTS

| 4,540,318 | 9/1985 | Hornung et al. | 408/9 |
| 4,618,805 | 10/1986 | Hornung | 318/245 |

FOREIGN PATENT DOCUMENTS 3501947  7/1986  Germany .

OTHER PUBLICATIONS

Willy Frank, "Phasenanschnittsteuerungen—problembezogen," in journal *Elektronik*, vol. 34, No. 4, pp. 86–90, Feb. 1985.

D. Dahms, "Familie integrierter Schaltungen zur Phasenanschnitt steuerung bzw. Null spannungs schaltung," in journal *Radio Fernsehen Elektronik*, vol. 37, No. 9, pp. 564–567, published 1988, East Berlin, Germany.

*Primary Examiner*—William M. Shoop, Jr.
*Assistant Examiner*—Brian Sircus
*Attorney, Agent, or Firm*—Frishauf, Holtz, Goodman & Woodward

[57] ABSTRACT

A control circuit is proposed, which can be used for the phase-shift control of an electric motor in an a.c. voltage supply line. The ground connector of the control circuit, together with the cathode of a semiconductor switch (triac), is directly connected with load current circuit. Because of this, it is possible to do without potential-separating means when it is intended to feed signals at the load current circuit directly into the control circuit. An auxiliary voltage source is connected between the synchronization input and the ground connector to maintain the function of the synchronization input.

10 Claims, 2 Drawing Sheets

SPEED CONTROL CIRCUIT FOR A UNIVERSAL MOTOR

FIELD OF THE INVENTION

The invention is based on a control circuit with phase shift control for a universal motor.

BACKGROUND

A control circuit of Telefunken is already known, which is designed as an integrated circuit and is identified by U2008B. This integrated circuit is supplied by the rectified d.c. current supply. The ground connector is directly connected with the second net connector. If a potential separation between the load current circuit and control current circuit of the triac is required, a transformer element such as an optical coupler or an ignition transformer is required. Not only is this additional element relatively expensive, but it also represents an additional failure risk.

SUMMARY OF THE INVENTION

In contrast thereto, the control circuit of the invention has the advantage that expenses are saved because of the omission of the transformer element. In addition, the strip conductor track on the printed circuit board is simplified in an advantageous manner.

A particularly advantageous disposition for the control pick-up 31 is obtained because it is possible to do without potential-separating means.

It is also advantageous that the motor winding can be used as a measuring resistor, and a resistor can thereby be dispensed with.

It is particularly advantageous when an auxiliary source is connected between the ground connector and the synchronizing connector in the control circuit, which contributes to maintain the synchronizing voltage in case of small operating angles. A particularly simple solution for the auxiliary source results when it contains a storage-capacitor which can be charged by the line voltage. Capacitors of this type require little space and can be obtained at small cost.

Because the control circuit can be put together with only a few components and therefore requires only little space, it is particularly suitable for use in electrical hand tools.

DRAWINGS

An exemplary embodiment of the invention is illustrated in the drawings and will be described in detail in the following description.

DESCRIPTION OF THE EXEMPLARY EMBODIMENT

Figure 1:
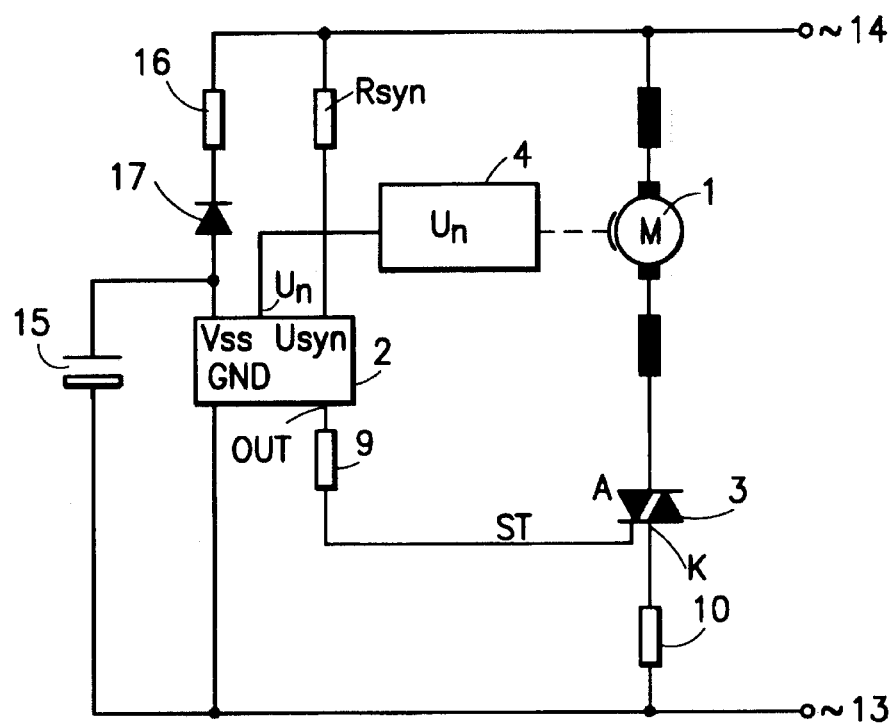
FIG. 1 shows a known circuit diagram.

It is known to employ the control circuit U2008B (Telefunken) of FIG. 1 for rpm control of an electric motor M connected to an a.c. voltage supply, with the load circuit of which a TRIAC (registered trademark for a gate-controlled semiconductor switch) is connected. In this case the control circuit is supplied via an input terminal VSS by means of a rectified voltage of the line supply, and a ground connector GND is connected with a second line of the line supply. It must be stressed in connection with this known circuit that it is necessary that the ground connector GND and the triac cathode be connected in series with the measuring resistor directly with the second connector of the line supply and an input Usyn via a resistor Rsyn with the first connector of the line supply.

Figure 2:
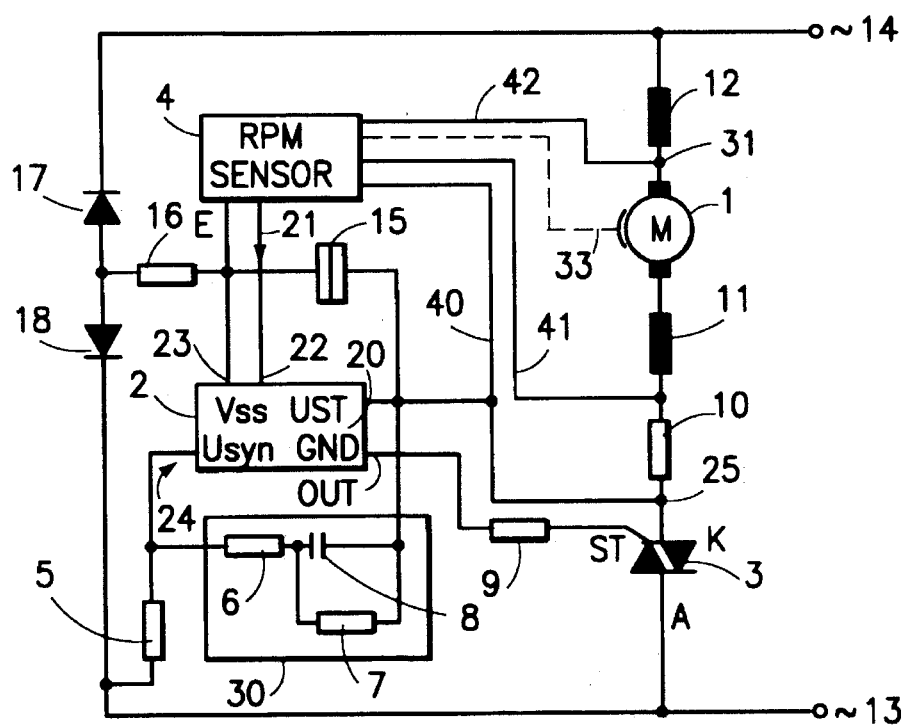
FIG. 2 shows a circuit diagram of the exemplary embodiment.
Figure 3:
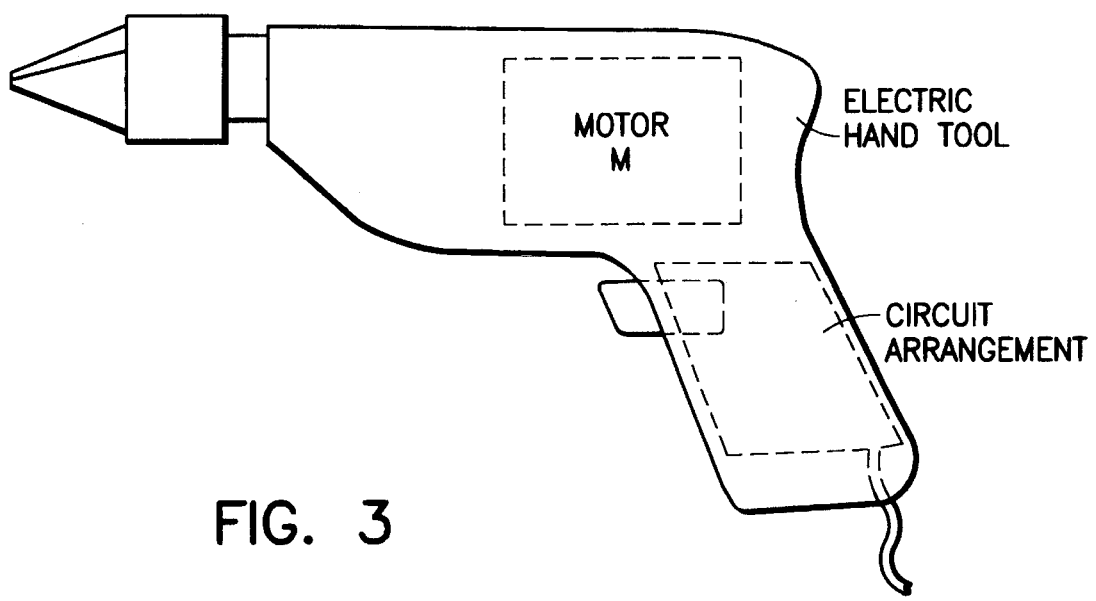
FIG. 3 shows a hand tool incorporating the universal motor and control circuitry of the exemplary embodiment.

In the circuit arrangement of FIG. 2, a control circuit 2 and a semiconductor switch in the form of a TRIAC 3 are inversely connected with the known circuit arrangement of FIG. 1. An electric motor 1 with its magnetic windings 11, 12 is connected in series with the triac 3 via a measuring resistor 10 at supply line terminals 13, 14 in a load current circuit. On the cathode side, the triac 3 is connected with the measuring resistor 10 at a junction 25. Furthermore, a ground connector 20 of the control circuit 2 is connected at the junction or internal ground point 25. The voltage supply of the control circuit 2 takes place via an input 23 from the voltage of the supply line rectified by means of diodes 17, 18. The rectified voltage is supplied via a series resistor 16 to the input 23 of the control circuit 2 as well as to the input E of a controller or RPM sensor 4.

The voltage is smoothed by means of a filter capacitor 15 which is connected to the ground connector 20. A synchronization input 24 of the control circuit 2 is connected with the triac anode and the terminal 13 of the line supply via a resistor 5.

An auxiliary source 30 is connected between the synchronization input 24 and the ground connector 20. The auxiliary source 30 has a resistor 6 and in series a capacitor 8. A resistor 7 is connected in parallel to the capacitor 8. A control input 22 of the control circuit 2 is connected with a control output 21 of the controller 4. An output 21 of the control circuit 2 is connected with a control input ST of the triac 3 via a resistor 9. To complete the picture it should be noted that the controller 4 has measuring lines 42, 41, by means of which the motor current can be measured. The rpm of the motor is detected by means of the line 33 shown in dashes, for example by means of a tachometer generator, or directly at a junction or control voltage pick-up point 31 between the field coil 12 and the armature via the line 42.

The mode of functioning of this circuit arrangement will be described in what follows. The ground connector 20 is then connected to the potential of the supply line terminal 13, as long as the triac 3 is conductive. Supply of the control circuit 2 at the terminal 23 takes place via the diode 17 and the resistor 16.

During the blocking phase of the triac 3, the supply of the control circuit 2 takes place via the diode 18 and the resistor 16. Because the load current circuit is almost currentless during the blocking phase of the triac 3, the ground connector 20 is for all practical purposes connected to the potential of the first supply line terminal 14. Thus the ground connector 20 floats between the potentials of the supply line terminals 13 and 14.

The voltage at the synchronization input 24 corresponds to the anode-cathode potential of the triac 3 and therefore is independent of the angle of current flow of the triac 3. To assure that even at a large angle of current flow, i.e. during a short blocking phase of the triac 3, the zero cross of the a.c. voltage is sufficient for synchronizing the control circuit, the auxiliary source 30 is connected in parallel to the synchronization input 24. The auxiliary source 30 is charged from the supply line during the blocking phase of the triac 3 and supplies the energy stored in the capacitor 8 to the synchronization input 24. It is possible by means of a suitable selection of the RC wiring of the auxiliary source 30 with the resistors 6, 7 to use the remaining voltage in an advantageous manner via the triac 3 for detecting the zero cross even with a very small operating angle near 0°. Because of this the circuit can be used practically over the entire range of control. Since in this arrangement the ground connector GND remains connected with the triac cathode as before, the ignition pulse need not be supplied to the triac via a potential-separating element.

In the simplest case, a tachometer generator can be used as control circuit 4, which picks up its rpm signal at the motor and supplies a voltage which is proportional to the rpm. The controller 4 is known per se, so that it need not be described in detail. Additional connectors 33, 40, 41 and 42 are provided in the exemplary embodiment of FIG. 2, by means of which the voltage at the motor and the current at the measuring resistor 10 can be detected. A differentiated control of the motor is possible with the help of these measuring signals.

It is also possible to employ other semiconductor switches, such as transistors or thyristors, in place of the triac 3.

Other known control circuits can also be used in place of the control circuit U2008B used, which are either available as integrated circuits or can be discretely constructed.

We claim:

1. A circuit arrangement for the control of a universal motor (1) on an a.c. voltage supply line, having an integrated circuit control circuit (2) having a ground connector terminal (20), a control input terminal (22), a voltage supply terminal (23) and a synchronization input terminal (24);

at synchronization resistor (5) having one terminal connected to a phase of said a.c. voltage supply and another terminal connected to said synchronization input terminal (24);

at semiconductor switch (3), connected between first and second a.c. supply lines (14, 13) of a load current circuit, having an anode, a cathode, and a control input (ST) which is connected with an output of said control circuit (2), said control circuit (2) being adapted for phase-shift control of the universal motor (1), wherein a control signal ($U_{ST}$) for the control circuit (2) is applied across said control input (22) and ground terminals (25) of the control circuit (2), an RPM sensor (4) is provided for detecting (41, 42) speed of the universal motor, the control signal or said control circuit (2) is picked up by said RPM sensor directly at the motor (1) in the form of an armature voltage and furnished from a control signal output (21) of said RPM sensor to said control input (22) of said control circuit, the ground connector (20) of the control circuit (2) is connected with an internal ground point or junction (25) located in the load current circuit between the semiconductor switch (3) and an armature (M) of the universal motor (1), and the semiconductor switch (3) is operated inversely by connecting its cathode (K) with the internal ground point or junction (25).

2. A control circuit in accordance with claim 1, wherein a control voltage pick-up (31) is provided, which is disposed between the armature (M) and a field coil (11,12).

3. A control circuit in accordance with claim 1, wherein a measuring resistor (10) is connected between the universal motor (1) and the cathode (K) of the semiconductor switch (3).

4. A control circuit in accordance with claim 1, wherein an auxiliary source (30) is provided, which is connected between the ground connector (20) and the synchronization input terminal (24) of the control circuit (2).

5. A control circuit in accordance with claim 4, wherein the auxiliary source (30) has a storage capacitor (8).

6. A control circuit in accordance with claim 5, further comprising means for charging the auxiliary source (30) using voltage from said a.c. supply lines.

7. A control circuit in accordance with claim 1, wherein the synchronization resistor (5) is connected with the anode of the semiconductor switch (3).

8. A control circuit in accordance with claim 1, wherein the control circuit (2) is employed for controlling an electric motor in an electric tool.

9. A control circuit in accordance with claim 1, wherein diodes (17, 18), which are connected in opposing directions between said supply lines (13, 14), are provided and the control circuit (2) is supplied (16) from a junction between said connected diodes.

10. The control circuit of claim 1, wherein said semiconductor switch (3) is a TRIAC.

* * * * *